(12) United States Patent
Aasheim et al.

(10) Patent No.: US 10,521,333 B2
(45) Date of Patent: Dec. 31, 2019

(54) AUTOMATED SYSTEM FOR FIXING AND DEBUGGING SOFTWARE DEPLOYED TO CUSTOMERS

(71) Applicant: Microsoft Technology Licensing, LLC, Redmond, WA (US)

(72) Inventors: Jered D. Aasheim, Eugene, OR (US); Tai Chian Chou, Bellevue, WA (US); Pranish A. Kumar, Sammamish, WA (US); Kun Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/356,379

(22) Filed: Mar. 18, 2019

(65) Prior Publication Data

US 2019/0213112 A1 Jul. 11, 2019

Related U.S. Application Data

(63) Continuation of application No. 15/478,587, filed on Apr. 4, 2017, now Pat. No. 10,275,338.

(51) Int. Cl.

| | |
|---|---|
| *G06F 11/36* | (2006.01) |
| *G06F 11/07* | (2006.01) |
| *G06F 9/44* | (2018.01) |
| *H04L 12/24* | (2006.01) |
| *H04L 29/06* | (2006.01) |
| *H04M 3/51* | (2006.01) |
| *H04M 3/523* | (2006.01) |

(52) U.S. Cl.
CPC ...... *G06F 11/3664* (2013.01); *G06F 11/0793* (2013.01); *H04L 65/1069* (2013.01); *H04L 65/403* (2013.01); *H04M 3/5191* (2013.01); *H04M 3/5233* (2013.01)

(58) Field of Classification Search
CPC .... G06F 8/71; G06F 11/3664; G06F 11/0793; H04L 41/5074; H04L 65/1069; H04L 65/403; H04M 3/5191; H04M 3/5233
See application file for complete search history.

(56) References Cited

U.S. PATENT DOCUMENTS

| | | | | |
|---|---|---|---|---|
| 10,275,338 | B2 * | 4/2019 | Aasheim | G06F 11/3664 |
| 2013/0046571 | A1 * | 2/2013 | Tuchman | G06Q 10/06 705/7.14 |
| 2015/0098561 | A1 * | 4/2015 | Etison | H04M 3/5175 379/265.06 |
| 2018/0285242 | A1 * | 10/2018 | Aasheim | G06F 11/3664 |

* cited by examiner

*Primary Examiner* — Harry S Hong
(74) *Attorney, Agent, or Firm* — Christopher J. Volkmann; Kelly, Holt & Christenson, PLLC

(57) ABSTRACT

A computer system assists in fixing issues. Ticket management logic receives an issue detected on a device. Diagnosing logic identifies the issue based on contextual information received from the device and stores issue data related to the issue into a data store. Routing logic receives an indication of a flagged component of the issue data, flagged by a developer, and initiates communication between a user and the developer based at least in part on the flagged component.

20 Claims, 16 Drawing Sheets

FIG. 5B

AUTOMATED SYSTEM FOR FIXING AND DEBUGGING SOFTWARE DEPLOYED TO CUSTOMERS

CROSS-REFERENCE TO RELATED APPLICATION

The present application is a continuation of and claims priority of U.S. patent application Ser. No. 15/478,587, filed Apr. 4, 2017, the content of which is hereby incorporated by reference in its entirety.

BACKGROUND

Computer systems are currently in wide use. Some such computer systems run applications that generate or display content. Examples of such applications include word processing applications that generate word processing documents, slide presentation applications that generate slide presentation documents, spreadsheet applications that generate spreadsheet documents, among a wide variety of others. There are many other types of applications as well.

Such applications at some point will exhibit an issue or bug that needs to be resolved. Currently developers use a variety of tools to address an issue or bug. Some of these include simulating the application in a controlled environment with the aid of a debugger. Debuggers offer functions such as running an application line-by-line, breaking at breakpoints and tracking values of variables. Some debuggers have the ability to modify an application's state while it is running. These types of tools are useful in solving a known issue, but are not as helpful in identifying the root-cause of large-scale client-side software issues. For large-scale client-side software or client-side software of any size, it is virtually impossible to replicate or simulate all possible user configurations. This results in an increasing number of issues which only occur in field deployed units.

Also, many current systems use support agents (who tend to be generalist s in their knowledge of a computing system) who manually attempt to group issues into groups and address all issues in the group in a similar way. This can be frustrating for a user experiencing the issue, and it can be substantially ineffective in fixing underlying issues.

The discussion above is merely provided for general background information and is not intended to be used as an aid in determining the scope of the claimed subject matter.

SUMMARY

A computer system assists in fixing issues. Ticket management logic receives an issue detected on a device. Diagnosing logic identifies the issue based on contextual information received from the device and stores issue data related to the issue into a data store. Routing logic receives an indication of a flagged component of the issue data, flagged by a developer, and initiates communication between a user and the developer based at least in part on the flagged component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 5A-5D show examples of developer interfaces.

DETAILED DESCRIPTION

Figure 1:
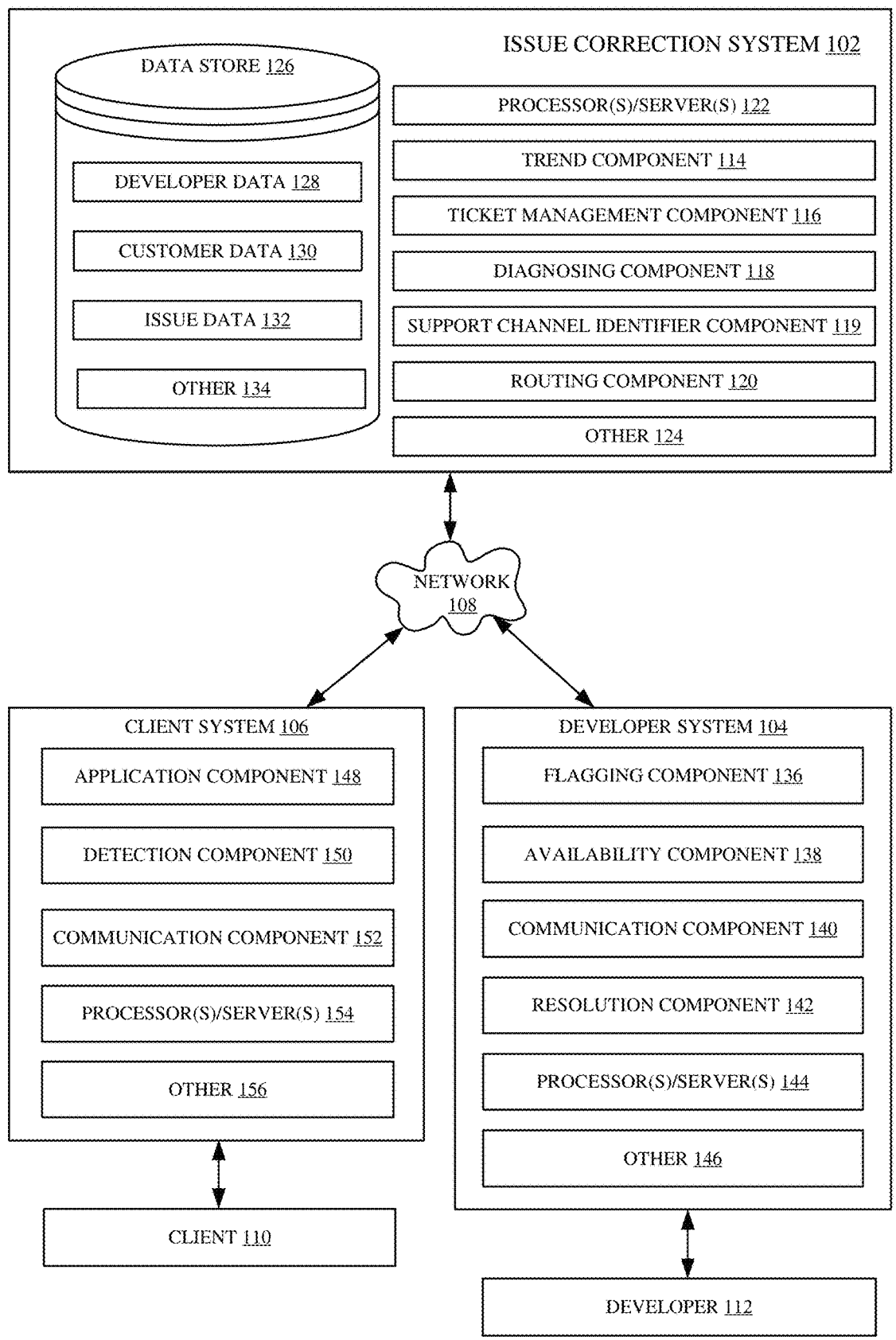
FIG. 1 is a block diagram showing one example of a computing system architecture.

FIG. 1 shows a diagram of one example of a computer system architecture 100. Architecture 100 includes issue correction system 102, client system 106 and developer system 104. Client 110 interacts with client system 106 to control and manipulate system 106. Developer 112 interacts with developer system 104 to control and manipulate system 104. Client system 106 and developer system 104 communicate with issue correction system 102 and each other through network 108. Network 108 can be any of a wide variety of networks or combinations of networks such as a wide area network, a local area network, a near field communication network, a cellular network or other networks. Before describing the overall operation of architecture 100 in more detail, a brief description of some of the items in architecture 100, and their operation, will first be provided.

In one example, issue correction system 102 includes trend component 114, ticket management component 116, diagnosing component 118, support channel identifying component 119, routing component 120, processors/servers 122 and data store 126. Processor(s)/server(s) 122 implement the logic and functionality of trend component 114, ticket management component 116, diagnosing component 118 and routing component 120. Ticket management component 116 receives issues (such as issue data describing an issue and context information and other information) from client 110. Ticket management component 116 can also send issues to developer 112. Trend component 114 manages the operation of identifying trends in the occurrence of issues received from clients 110. Diagnosing component 118 identifies and classifies issues submitted by clients 110. Routing component 120 routes the client 110 and their issue to a developer 112. During the operation and functions of these components, data store 126 is accessed for both retrieval and storage of data. Accessing data store 126, by these components, can be accomplished by processors/servers 122.

Data store 126 can include developer data 128, client data 130, issue data 132 and other data 134. Developer data 128 can store information corresponding to a plurality of developers 112, for example availability, expertise, work history, issue interest etc. Client data 130 can store information corresponding to a plurality of clients 110, for example issue history, client location, name, contact information, etc. Issue data 132 can store information corresponding to a plurality of issues, for example client ID, identification of the software where the issue occurred, contextual information (other software running simultaneously, etc.), build version, etc. Data store 126 may also store other data 134 that does not fit into the other datasets. Issue correction system 102 can include other items 124 as well.

Client system 106, in one example, includes application component 148, detection component 150, communication component 152, processor(s)/server(s) 154 and it can include other items 156. Application component 148 is a component that runs an application. Detection component 150 can run simultaneously with application component 148, detecting any issues that may arise in application component 148. An issue is a problem that degrades or inhibits the correct operation of the application run by application component 148. Communication component 152 allows client system 106 and client 110 to communicate with network 108, issue correction system 102, developer system 104 and developer 112. Processor(s)/server(s) 154 can implement the functionality and logic of application component 148, detection component 150, communication component 152 and any other functions 156 of client system 106.

Developer system 104 can include flagging component 136, availability component 138, communication component 140, resolution component 142, processor(s)/server(s) 144 and it can also include other functionality 146. Flagging component 136 allows the developer 112 to flag an issue of interest. Availability component 138 allows the developer 112 to identify their availability, for example based on a selected time frame or bandwidth/work load. Communication component 140 allows developer 112 and developer system 104 to communicate with client 110, client system 106, network 108 and issue correction system 102. Resolution component 142 allows developer 112 to address or resolve an issue. Processors 144 can implement the functions and logic of flagging component 136, availability component 138, communication component 140, resolution component 142 and any other functionality 146 of developer system 104.

Figure 2:
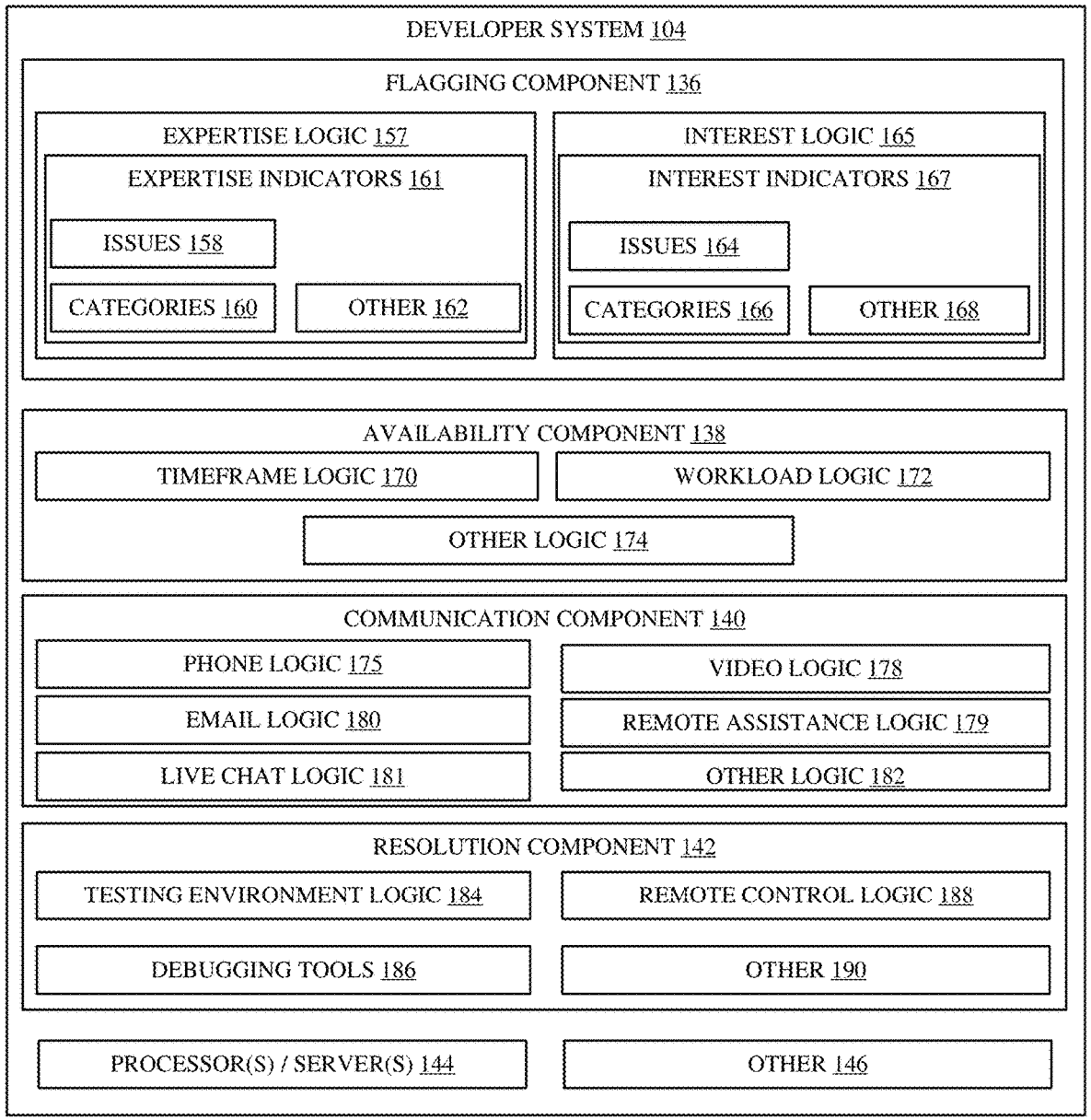
FIG. 2 is a block diagram showing one example of a developer system, in more detail.

FIG. 2 is a block diagram showing one example of a developer system 104 in more detail. In the example shown in FIG. 2, flagging component 136 illustratively includes expertise logic 157 and interest logic 165. Expertise logic 157 can generate an interface that includes functions allowing a developer 112 to set expertise metrics or expertise indications 161 that indicate the developer's expertise in relation to issues 158, issue categories 160 and other items of expertise 162. Interest logic 165 can generate an interface that includes functions allowing a developer 112 to set interest metrics or indicators 167 that indicate the developer's interest in issues 164, interest categories 166 and other interests 168.

Issues may be narrowly defined. For example, an issue may be defined as a single variable having a bad value. Issues may also be more broadly defined. For example, an issue may be defined as failure to load a resource. Issue categories may also be narrowly defined, such as for example, returning null values. Issue categories 166 may also be more broadly defined, such as for example, install failures.

Availability component 138 can generate interfaces with functions allowing a developer 112 to identify his or her availability based on several factors. In the example illustrated, those factors can be set by timeframe logic 170 that allows a developer to set his or her time frame 170, workload logic 172 that allows the developer to identify his or her availability in terms of his or her workload and other items 174. Time frame logic 170 can allow the time frame of availability to be set by the developer 112 as either a block time or set on a live play/pause basis. Workload logic 172 can allow the workload availability to be set manually by the developer 112 based on what he or she is currently working on. In one example, workload logic 172 can also automatically detect workload availability of the developer. There can also be other availability factors other 174, for example, when the developer 112 is on a break, at home or in a meeting. In a scenario where an attempt is made to contact a developer 112 who is away, availability component 138 may generate a response indicating why the developer is not available and/or when the developer will be available.

Communication component 140 can implement a variety of different communication protocols. For instance, phone logic 176 can implement a phone communication protocol. Video logic 178 can implement a video communication protocol. Remote assistance logic 179 can implement a remote assistance protocol. Email logic 180 can implement an email protocol. Live chat logic 181 can implement a live chat protocol and other communication logic 182 may be utilized to implement other protocols instead, or in addition. It will be noted that remote assistance gives the developer full access to the state of the machine, which can be useful in situations where the developer is unable to correctly identify the logging and/or diagnostics needed to debug or otherwise address the issue using other means.

Resolution component 142 can include logic and functionality for developer 112 to resolve an issue. As illustrated, resolution component 142 can include testing environment logic 184, debugging tools 186, and remote control logic 188, although resolution component 142 can include other functionality 190 as well. Testing environment logic 184 allows a developer 112 to reproduce, simulate and/or test an issue. Debugging tools 186 allow a developer to debug an issue. Debugging tools 186 may include functions to run an application line-by-line, break the application at breakpoints, track values of variables, modify the application's state while it is running, etc. Remote control logic 188 can allow a developer to remotely control client system 106.

Processor(s)/server(s) 144 can implement the functions, logic, data calls, etc. of the other components and logic. Developer system 104 is not limited to the components and logic shown but can include other items 146. Some examples of other items are displays, input components, output components, networking components, etc.

Figure 3:
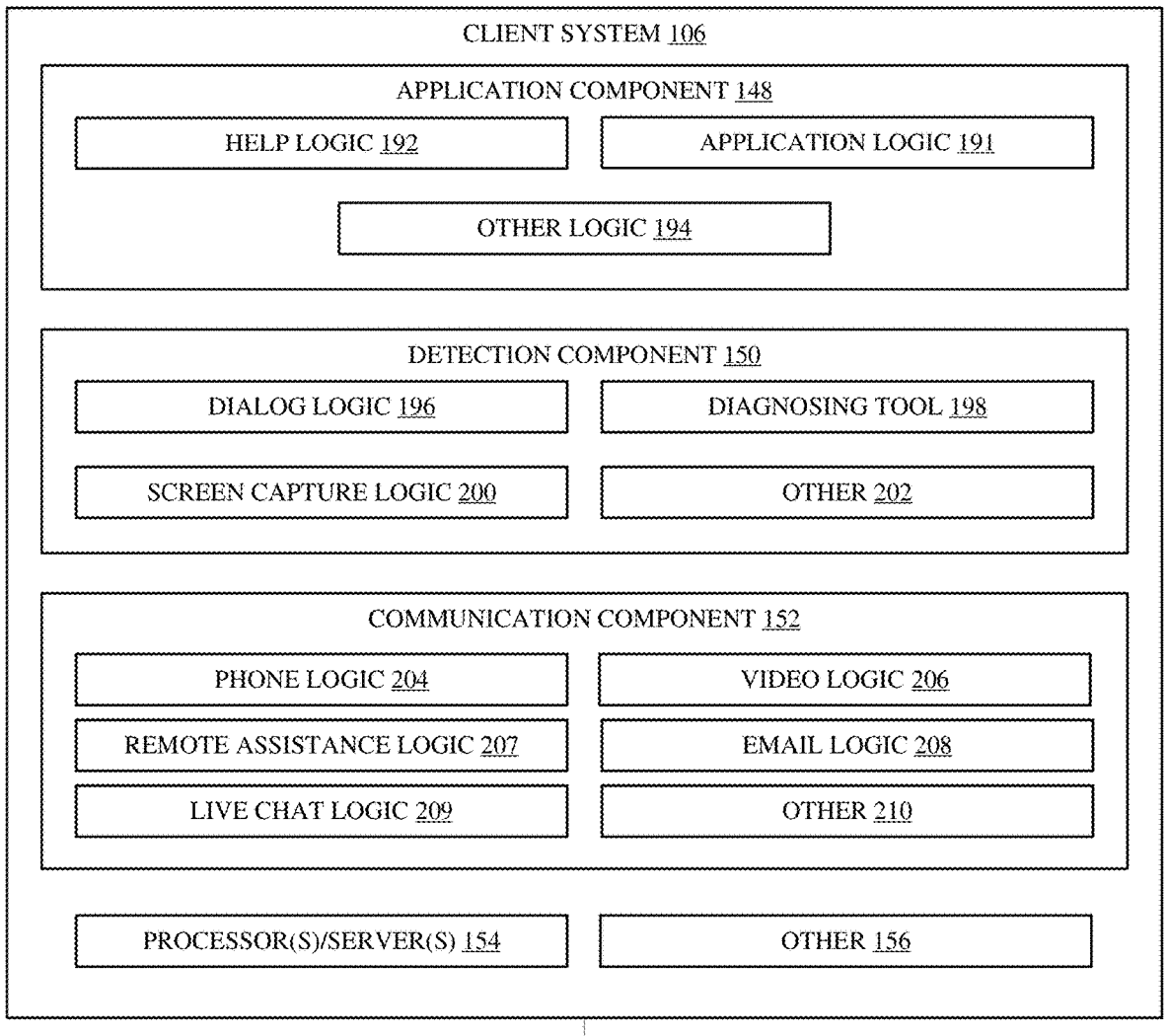
FIG. 3 is a block diagram showing one example of a client system, in more detail.

FIG. 3 is a block diagram showing one example of a client system 106, in more detail. As shown, client system 106 includes application component 148, detection component 150, processor(s)/server(s) 154 and communication component 152, although client system 106 can include other components 156 as well. Application component 148 allows a client 110 to run an application 191. During operation of application 191 a client can request help using help logic 192. Help logic 192 can generate an interface with functionality that allows client 110 to report an issue, contact a developer 112 or manually troubleshoot an issue. Application component 148 can also include other functionality or logic 194.

Detection component 150 detects an issue during operation of application 191. Detection component 150 can also collect information about the issue and the system the issue arose in. In one example, an issue is detected automatically and sent to the issue correction system 102. In another example, once an issue is detected, dialog logic 196 displays a dialog to the client 110. The dialog displayed by dialog logic 196 allows a client 110 to enter additional information regarding the issue, on the dialog, and the context in which the issue arose. Diagnosing tool 198 may automatically gather information about the issue and the system the issue arose in. Often the system status in which the issue occurred is just as important as the issue itself. Knowing a system status can more quickly lead the developer to the root-cause of an issue. For example, if one hundred users are having the same issue in software X and those same one hundred users were all running software Y at the same time the issue occurred, there might be a conflict between software X and software Y. Screen capture logic 200 can take a screen capture when the issue is detected, which provides this, and additional information. Detection component 115 may also include other functionality 202 related to the detection of an issue.

Communication component 152 can implement a variety of different communication protocols. For instance, phone logic 204 can implement a phone communication protocol. Video logic 206 can implement a video communication protocol. Remote assistance logic 207 can implement a remote assistance protocol. Email logic 208 can implement an email protocol. Live chat logic 209 can implement a live chat protocol, and other communication logic 210 may be utilized to implement other protocols instead, or in addition.

Processor(s)/server(s) 154 can implement the functions, logic, data calls, etc. of the components and/or logic described above. Client system 106 is not limited to the components shown, as indicated by other logic 146. Some examples of other components/logic are displays, input components, output components, networking components, etc.

Figure 4A:
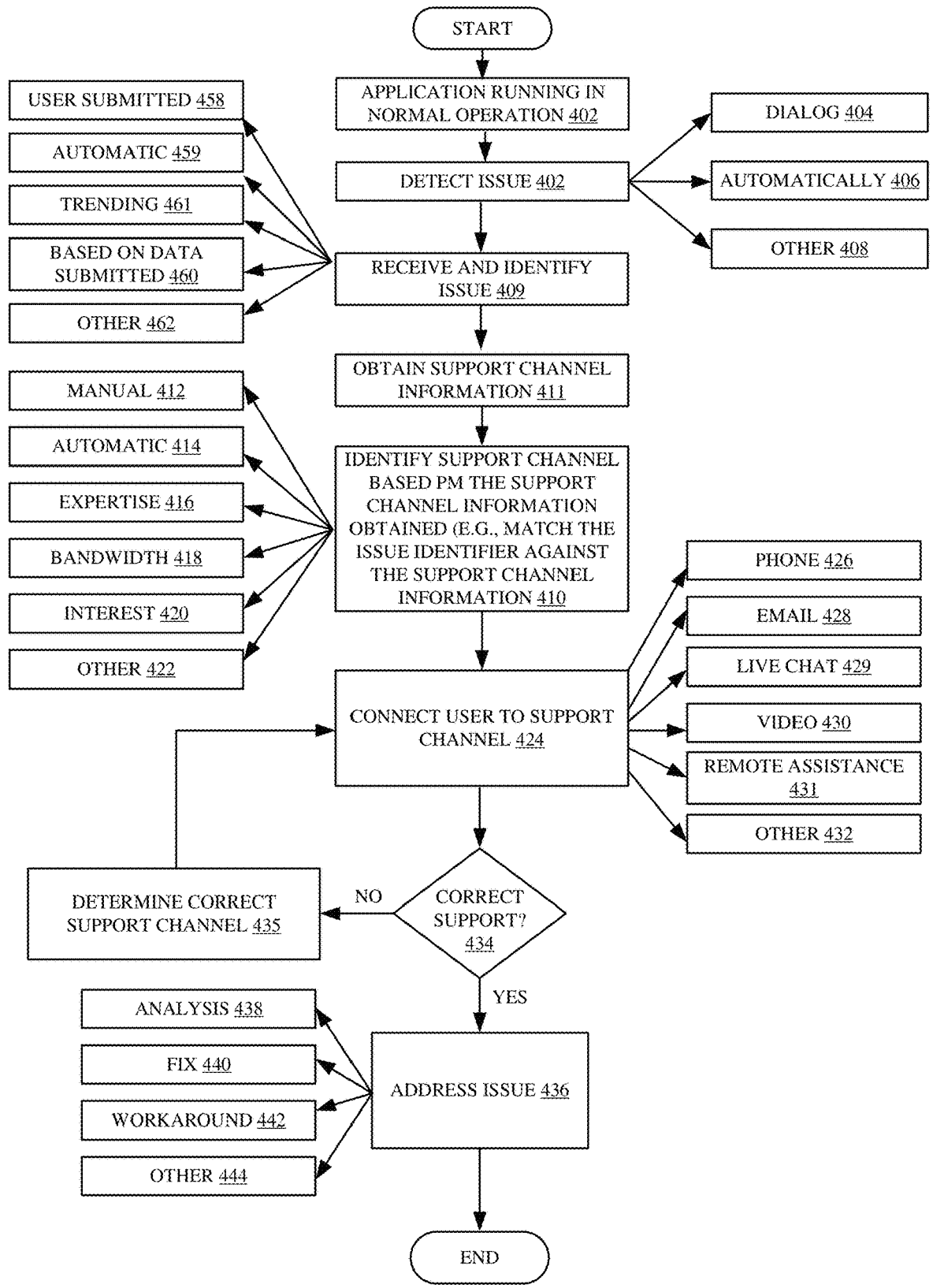
FIGS. 4A-4C (collectively referred to herein as FIG. 4) show a flow diagram illustrating one example of the operation of the architecture shown in FIG. 1 in addressing an issue.
Figure 4B:
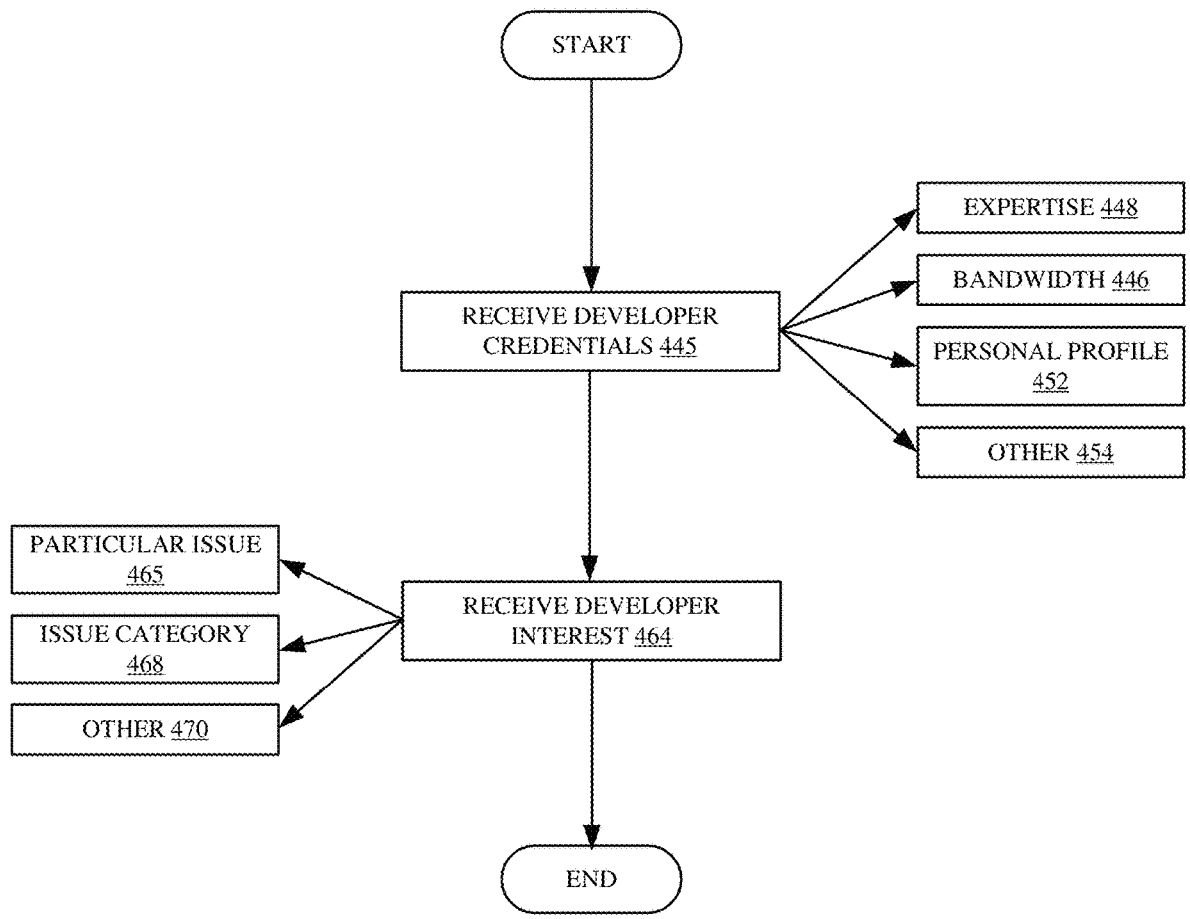
Figure 4C:
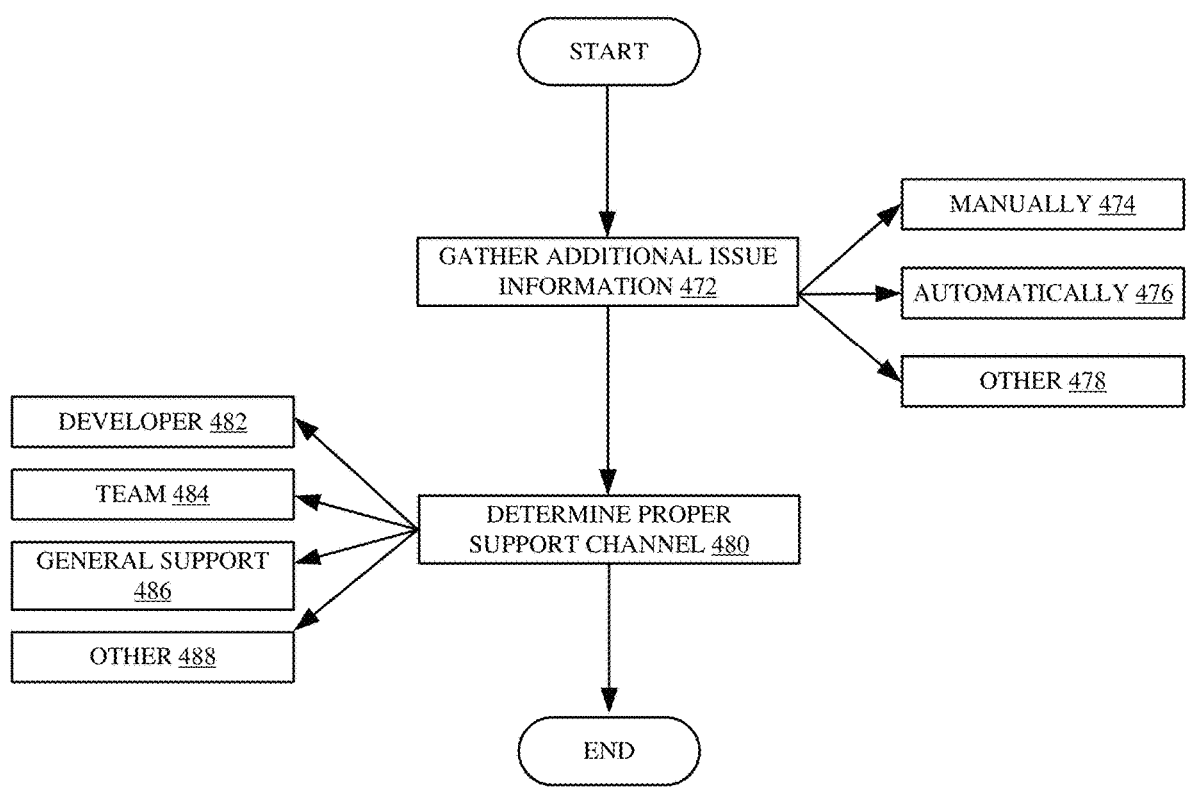

FIGS. 4A, 4B and 4C (collectively referred to herein as FIG. 4) show a flow diagram illustrating one example of the operation of architecture 100. First, it is assumed that a client 110 is running an application 191 on client system 106. Sometime during the operation, an issue is detected, as indicated by block 402. The issue may be detected by the user 110 and manually entered by the user 110 as indicated by block 404. The issue can also be automatically detected by detection component 106 or other items on client system 106 which is indicated by block 406. Automatic detection can be accomplished through the use of a diagnosing script or detection of an exception. There may also be other means of detecting an issue, as indicated by block 408, which may include, for example, a combination of both automatic and manual detection.

After an issue is detected, a description of the issue and customer data are obtained by detection component 150 or any other item and sent to issue correction system 102 where the issue is received and identified. Receiving the description of the issue and customer data (and other data) at issue correction system 102, and identifying it is indicated in block 409. In one example, the data is sent automatically upon detection. In another example, the user takes an action to send the data. The action taken can be visiting a troubleshooting website. In one example, the website has issue identifying information in a URL that is passed to issue correction system 102. The issue is received by ticket management component 116 and identified by diagnosing component 118. The issue and its diagnosis (if any) are stored as issue data 132 (in FIG. 1) as indicated by block 456. The corresponding customer data as stored in customer data 130 (in FIG. 1). Diagnosing component 118 may identify the issue based on a number of criteria including if the issue was user submitted, as indicated by block 458, or automatically submitted, as indicated by block 459. Diagnosing component 118 may identify the issue based on the data submitted to the system. For example, it may identify the issue based on the variable and its value that caused the issue as indicated by block 460. Diagnosing component 118 may interface with trend component 114 to identify trending issues or trending issue categories as indicated by block 461. Identifying trending issues may result in the issue being resolved before it becomes widespread. For example, if a new update is released and many users who installed the update are having the same issue, this trending issue can be prioritized and fixed before more users install the update. The issue can be identified or processed in other ways as well, as indicated by block 462.

After receiving an issue from a client 110, the issue correction system 102 retrieves information about potential support channels that can be used to address the issue. This is indicated by block 411 and described in further detail in FIG. 4B below. Support channel identifier component 119 in issue correction system 102 then determines the support channel that is to be used to resolve the issue, based on the retrieved information, as indicated in block 410. Identifying the support channel can be done manually 412 or automatically 414. Manually identifying the support channel can include surfacing an interface for an agent who specializes in diagnosing issues and routing to a best support channel. The agent can automatically receive issue information for routing via support channel identifying component 119 and communication component 152. The agent can also gather information manually by communicating with the user. Automatic support channel identification can be accomplished by routing component 120. Automatically identifying a support channel can be accomplished based on developer expertise as indicated in 416, developer bandwidth as indicated in block 418, developer interest as indicated in block 420 or other factors 422. For example, assume that Client A is having issue X and developer B is interested directly in issue X and is highly qualified but is currently at home sick. In such a scenario, Client A may be routed to developer C who is interested in category X, who is qualified and who is available.

Once a support channel is identified issue correction system 102 connects client 110 and client system 106 to the identified support channel. This is indicated by block 424. For instance, client 110 and client system 106 can be connected to developer 112 and a developer system 104, where developer 112 and developer system 104 are identified as the support channel. Connection can be established through a variety of protocols including telephone 426, email 428, live chat 429, video 430, remote assistance 431 or other communication protocols 432. Other communication protocols 432 can include VoIP, or other real-time communications.

After client 110 and developer 112 are connected the support channel can determine if the correct support channel was selected. This is indicated by block 434. Determining whether the correct support channel was chosen can be done in a wide variety of different ways. For instance, developer 112 may determine, after analysis of received data, that the issue is not the issue that developer 112 wishes to address. If it is determined at block 434 that the incorrect support was selected, a determination of the correct support channel may be made, as indicated by block 435 and as described in greater detail below with respect to FIG. 4C. If it is determined at block 434 that the correct support was selected, the issue will be addressed as indicated by block 436. Addressing an issue can include analyzing the issue as indicated in block 438, fixing the issue as indicated in block 440, implementing a work around 442 or other resolutions 444. Some issues may be too large to fix immediately and may need to be sent back to a development team for addressing. However, by identifying the issue in real environments, its root-cause can be better determined.

FIG. 4B shows a flow chart of one example of obtaining support channel information (as discussed above with respect to block 411 in FIG. 4A). The issue correction system 102 illustratively surfaces an interface for developer 112 with an input mechanism that can be actuated by developer 112 to receive credentials of a developer 112 as indicated in block 446. The received credentials can include expertise 448, bandwidth 450 and personal profile information 452 as well as other credentials 454. These credentials are stored in developer data 128. The developer 112 then utilizes flagging component 136 to select an issue of interest from issue data 132. This interest is sent by communication component 140 and received by issue correction system 102 as indicated in block 464. The received interest can comprise a particular issue 466 or an issue category 464. It can also comprise other interest 470. The data can be saved as developer data 128 and/or as issue data 132. Support channel identifying component 119 can then identify the support channel based on this data, as discussed above with respect to block 410 in FIG. 4A.

FIG. 4C is a flow chart showing one more detailed example of identifying a different support channel and rerouting an issue to that support channel, as shown briefly at block 435 in the flow diagram of FIG. 4A. If it is determined at block 434 (FIG. 4A) that the incorrect support channel was selected additional information may need to be gathered as indicated in block 472 to identify the correct support channel. Additional information may be gathered manually as indicated by block 474. Manual information may be gathered from client 110 through a dialog or by a developer 112 using remote assistance and control. Manual information may be gathered from client 110 through an agent performing (or specializing in) issue diagnosis. Additional information may also be gathered automatically by detection component 150 and/or diagnosing component 118, as indicated by block 476. Automatic information may be gathered through use of a diagnosing script, user profile/context information, telemetry, business intelligence or other logic. Further, additional information may be gathered through a combination of manual and automatic methods, or in other ways as indicated by block 478.

The additional gathered information can be used to re-route the client 110 to the proper support channel, as indicated by block 480. The proper support channel can be another developer, as indicated by block 482. It can also involve an escalation to a development team or other team, as indicated by block 484. The proper support channel can also be a general support contact or channel for the current issue as well as other unrelated issues, as indicated by block 486. The proper support channel can also be another type of support channel, for example a troubleshooting website or other support channel 488. Once the proper support channel is determined the client is connected to the determined support channel as indicated by block 424 in FIG. 4A.

Figure 5A:
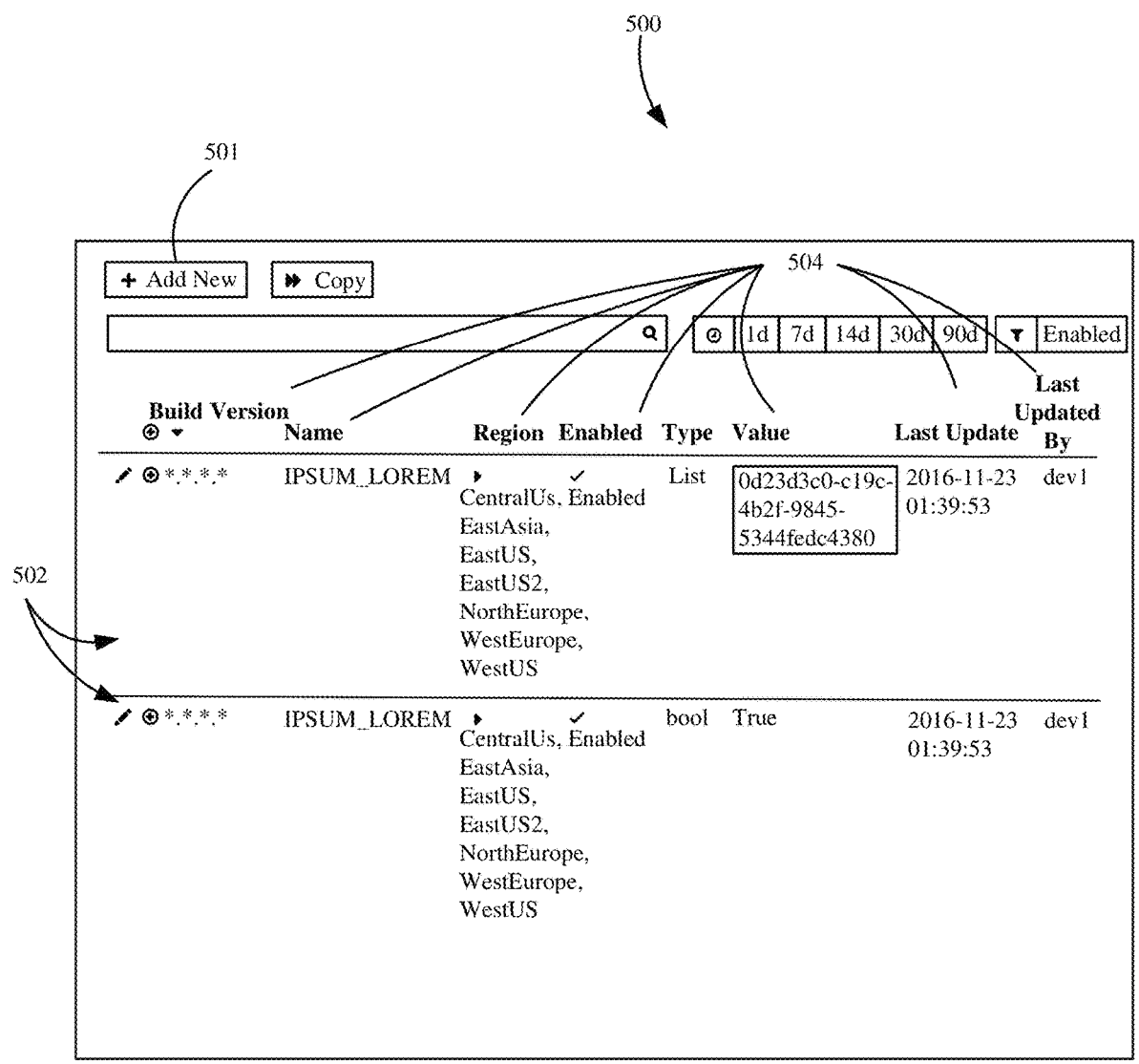

FIG. 5A illustrates one example of a user interface 500. User interface 500 can be generated for developer 112 and allows the developer to identify his or her interest in various issues. Interface 500 has a user input mechanism 501 that can be actuated by developer 112 to add an issue that he or she is interested in addressing. When the user input mechanism 501 is actuated, the developer can be navigated to user input mechanisms that allow the developer 112 to identify the issue(s). In the example shown in FIG. 5A, developer 112 is interested in two issues shown generally at 502. These issues 502 can both be for the same software (or for different software). Each issue 502 has a number of descriptive elements 504. The elements 504 can be selected by the developer 112 so developer 112 identifies issues that correspond with his or her expertise and interest. Some of the elements 504 are build version, name, region, enabled, type, variable, value, last update, date and user. Build version as shown includes four wildcard characters, meaning that any build of the software is of interest to the developer. Name as shown is the name of a variable in the software which the developer has interest in. Region is the region which the developer has interest in. Region could correspond to a version of the software or could correspond to the region the client is located in or that corresponds to a language spoken by the developer, etc. Enabled is a toggle to show that the developer is actively interested in working with clients on this issue. Type is the datatype of the named variable. Value is the value of the variable at which the developer is interested. In one example, the value could include a relational operator i.e. when the value is at least x, the developer is interested or if the value is equal to x, the developer is interested, etc.

Figure 5B:
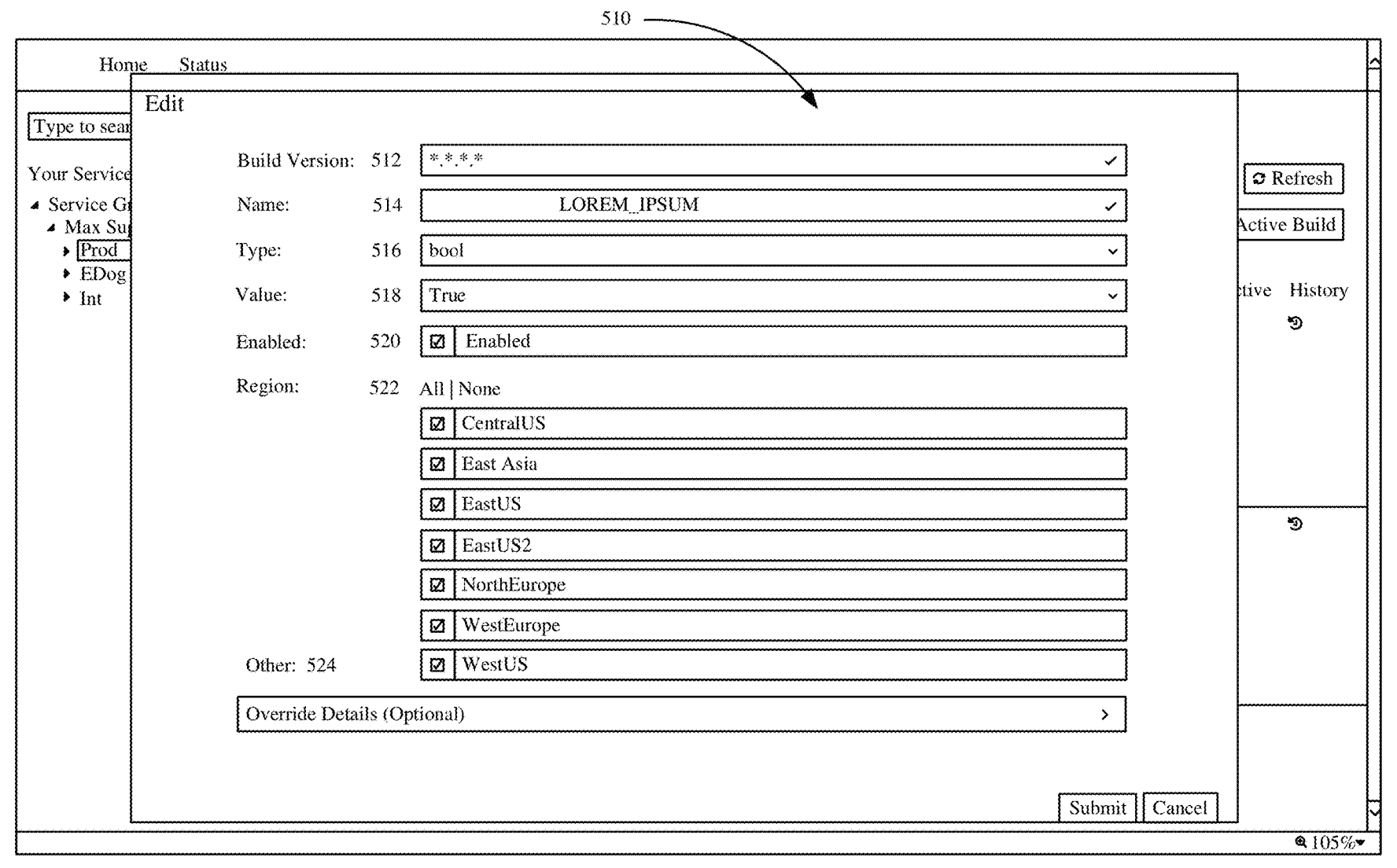

FIG. 5B illustrates one example of an interface 510 where a developer 112 can add an issue of interest or edit the elements of an issue 502. Elements 504 can include build version 512, name 514, type 516, value 518, enabled 523, region 522 and other element(s) 524. Build version 512 is where a developer 112 can select the build version of the software they are interested in testing. Name 514 determines what variable within the software the developer 112 is monitoring. Type 515 determines the type of the named variable. Value 518 determines the value of the variable in which the developer 112 is interested. Enabled 520 determines whether the developer 112 has this flag enabled, e.g. whether the developer is currently interested in addressing the issue. Region 522 is the regions that the issue should be tracked in. These are not the only issue elements that can be set by the developer 112. Developer 112 may also create his or her own custom elements as indicated by other elements 524.

Figure 5C:
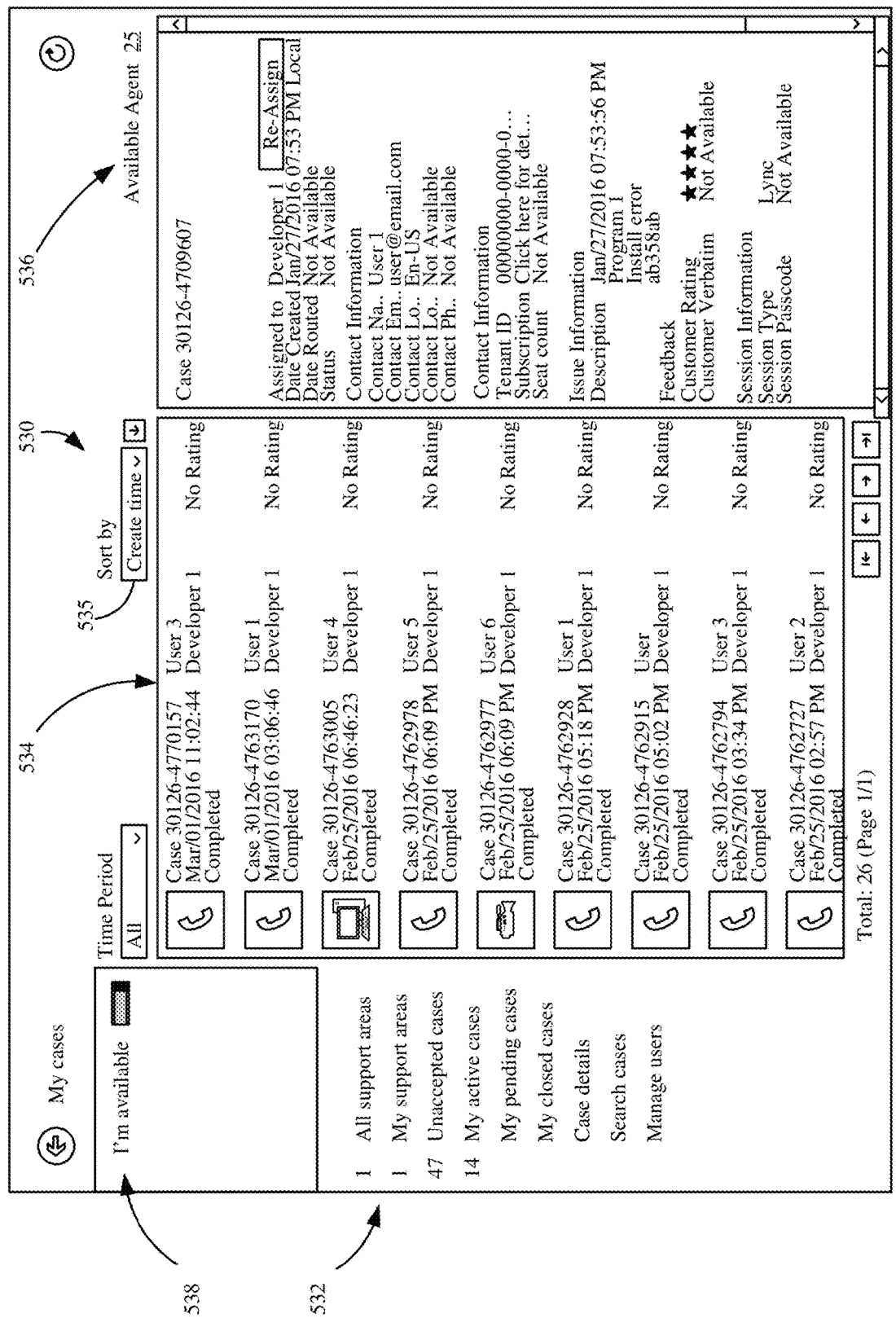

FIG. 5C illustrates one example of an interface 530 which can be generated to allow developer 112 to view his or her cases related to the selected issues 502. Interface 530 includes categories input mechanism 530, case pane 534, case details pane 536 and availability mechanism 538. Categories input mechanism 532 allows the developer 112 to choose a subset of his or her cases. In one example, sort mechanism 535 allows the subsets to be sorted by sort criteria such as time they were created, case status (i.e. active, on active, solved, etc.) among other things. Case pane 534 displays a subset of the developer's cases. Each case may have several identifiers such as communication type, title, date, status, parties and rating. Communication type as shown is a logo or icon corresponding to the type of communication the parties had established, such as a phone call, video call and remote assistance. Cases in case pane 534 can also have fewer or more identifiers based on the developer's preferences.

Case details pane 536 displays further information on a selected case for a selected case in pane 534. Case details pane 536 in the example shown, includes a title, dates, assigned developer, status, user contact information, tenant information, issue information, feedback and session/communication information. Case details pane 536 can also display lesser or greater amounts of information based on the developer's preferences.

Interface 530 includes availability mechanism 538. Actuating availability mechanism 538 toggles to show whether the developer is currently available to assist a user with an issue.

Figure 5D:

FIG. 5D illustrates one example of an interface 550 generated after toggling mechanism 538 to show that the developer is not available. As shown interface 550 indicates that the developer is unavailable. Interface 550 also has mechanisms that the developer can use to identify a reason for their unavailability i.e. on a case, break, training, away, or any other custom reason.

Figure 6:
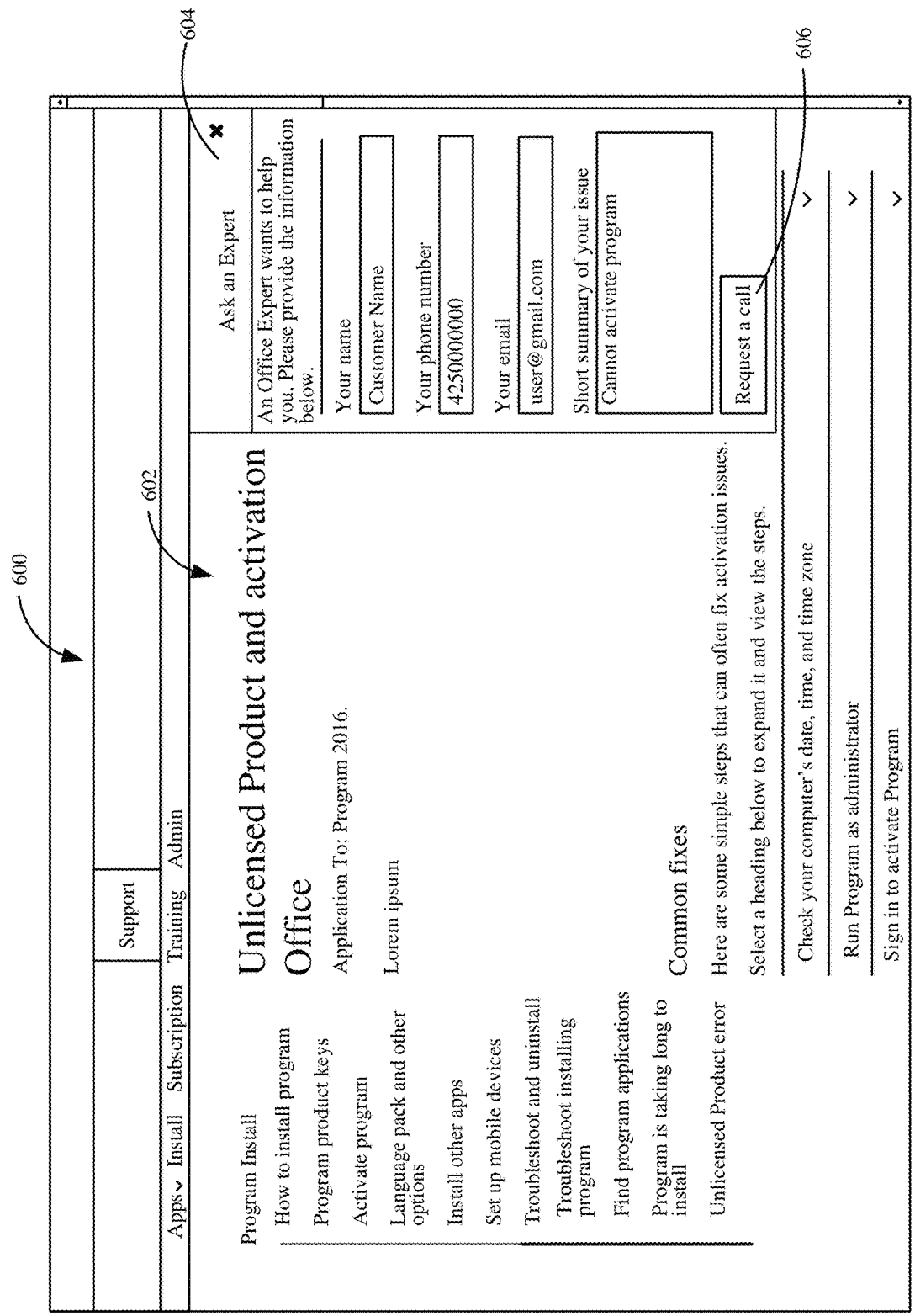
FIG. 6 is one example of a client interface.

FIG. 6 illustrates one example of an interface 600 that the user or client 110 may encounter upon detecting the issue. Pane 602 in the example shown, displays manual troubleshooting and common fixes for common issues. Pane 602 itself can have an identifying URL or code which contains information about the issue currently facing the user. Upon initiating communication, the URL or code can be sent to issue correction system 102 for issue identification. Once the issue is identified the developers who have shown interest in the issue can be identified. Pane 604 allows a user to contact a developer 112. Some brief information can be provided by the user to aid the developer in assisting with their issue. Pane 604 can also have an input mechanism 606 which allows the user to initiate communication with a developer. In another example, the user is automatically connected to the developer.

It can be seen that the present discussion provides a system that connects a user experiencing an issue to a developer who has expertise (or who may be a specialist) and/or interest, and availability, for addressing the issue. The connection is made in real time so the context of the user system when the issue arose can easily be identified. This greatly enhances the operation of the system itself, as it expedites and simplifies troubleshooting and issue resolution. It also enhances the user experience because issues are addressed more quickly.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
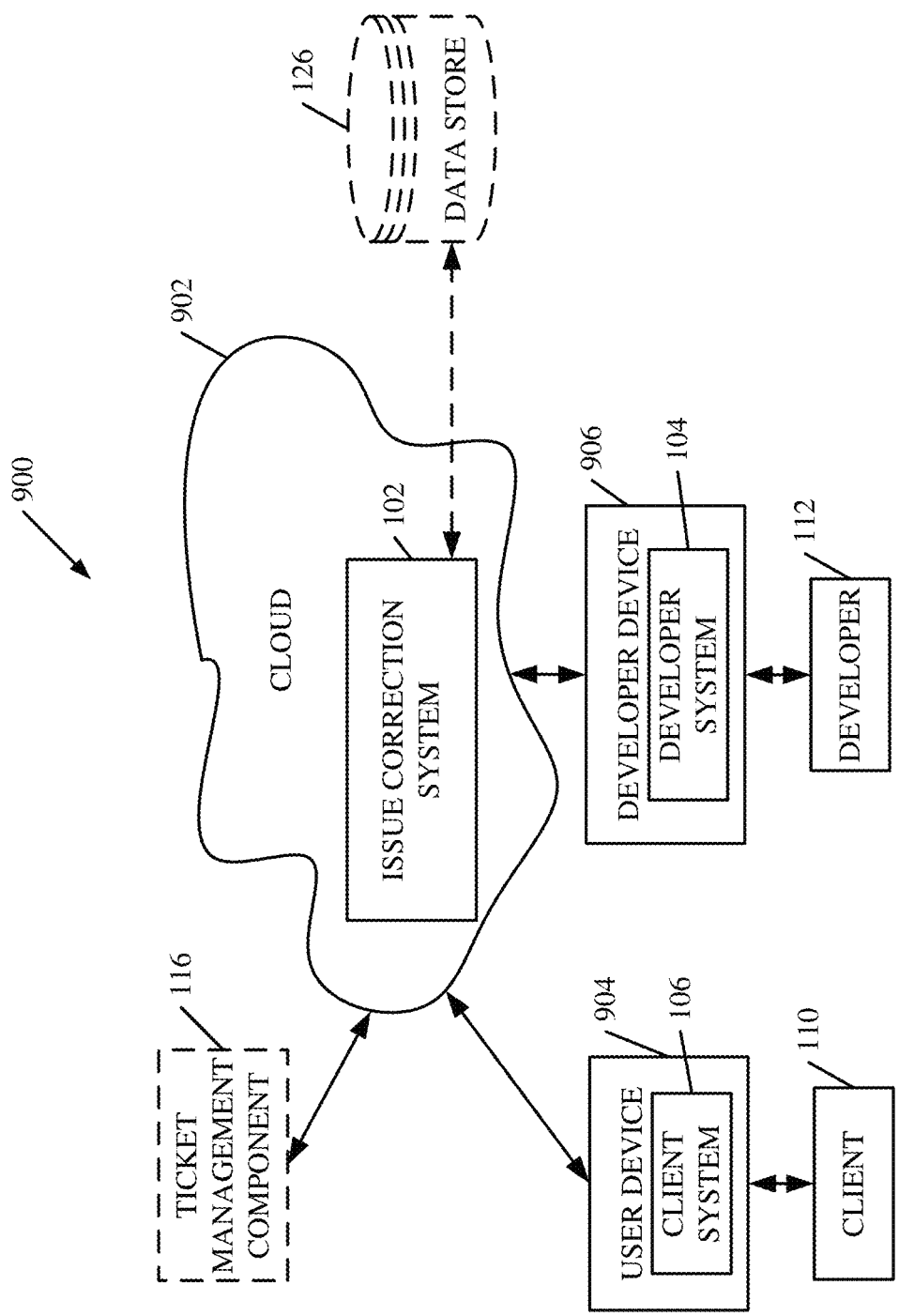
FIG. 7 is a block diagram of one example of the architecture shown in FIG. 1, deployed in a cloud computing architecture.

FIG. 7 is a block diagram of architecture 100, shown in FIG. 1, except that its elements are disposed in a cloud computing architecture 900. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that issue correction system 100 can be located in cloud 902 (which can be public, private, or a combination where portions are public while others are private). Therefore, users 110 use user devices 904 that include client systems 106, respectively, to access system 102 and developer system 104 through cloud 902. Developer 112 uses developer device 906 to access systems 102 and 106 through cloud 902.

FIG. 7 also depicts another example of a cloud architecture. FIG. 7 shows that it is also contemplated that some elements of system 102 can be disposed in cloud 902 while others are not. By way of example, data store 126 can be disposed outside of cloud 902, and accessed through cloud 902. In another example, ticket management component 116 can be outside of cloud 902. Regardless of where they are located, they can be accessed directly by devices 904-906, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
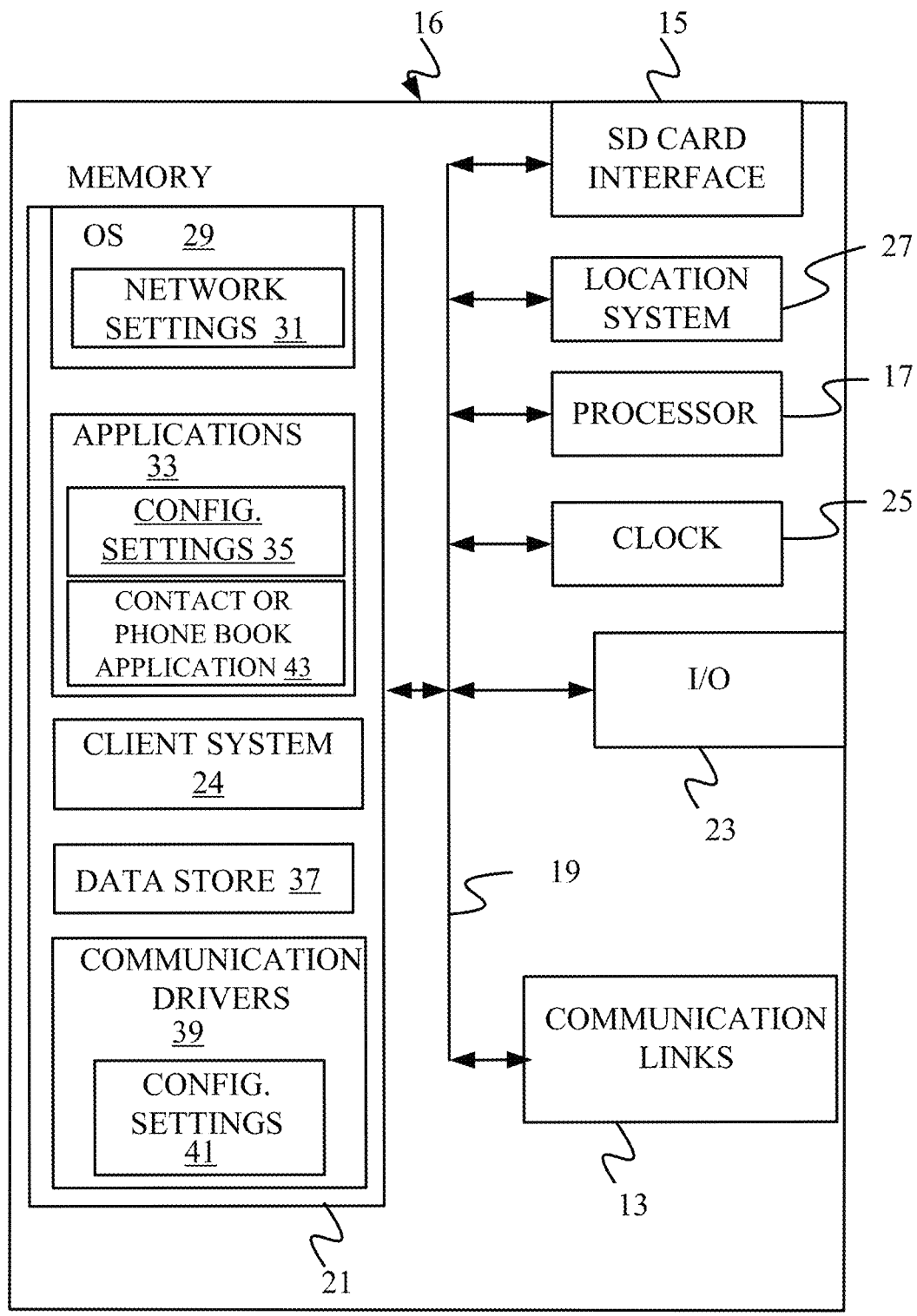
FIGS. 8-10 show examples of mobile devices that can be used in the architectures shown in the previous figures.
Figure 9:
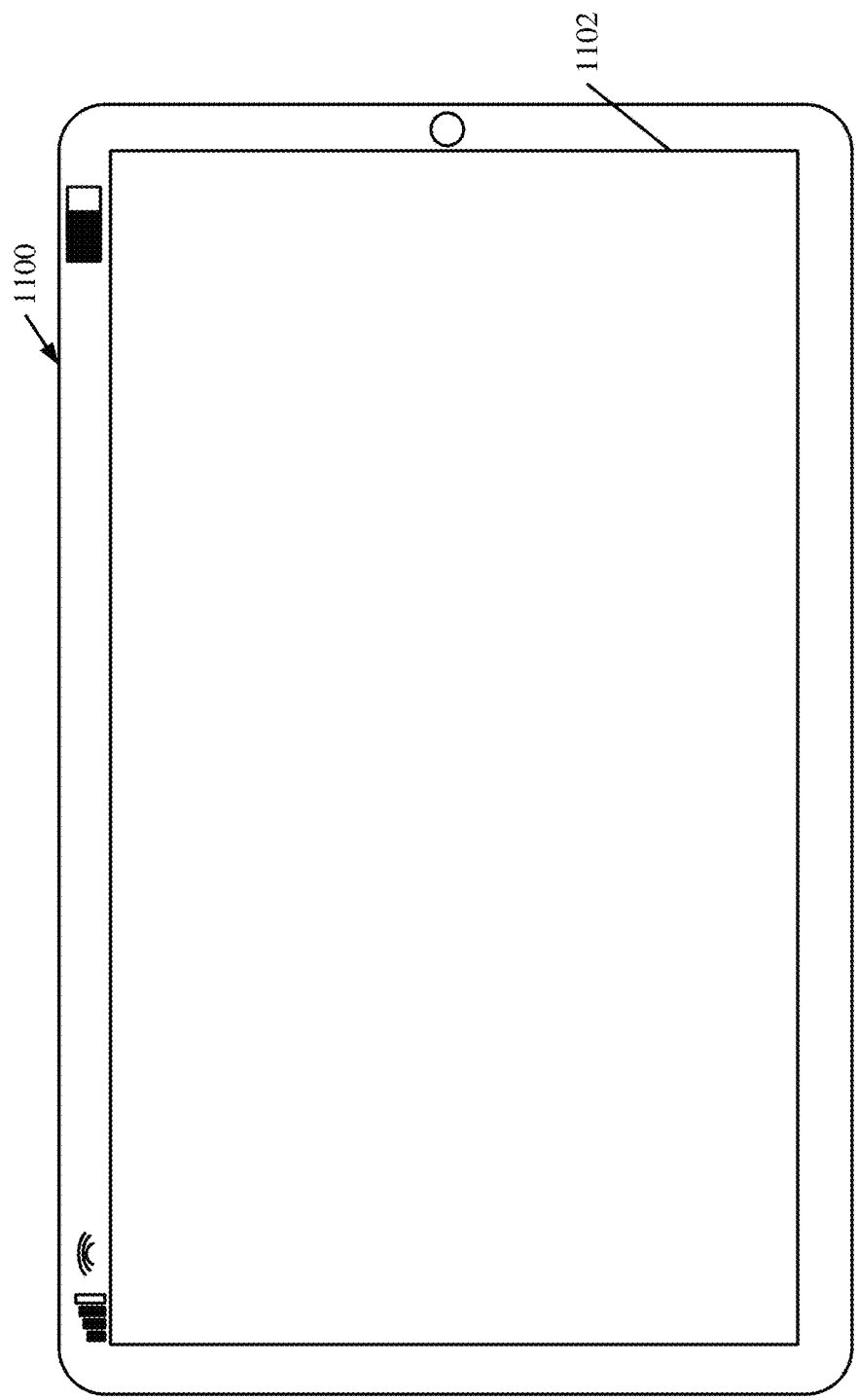
Figure 10:
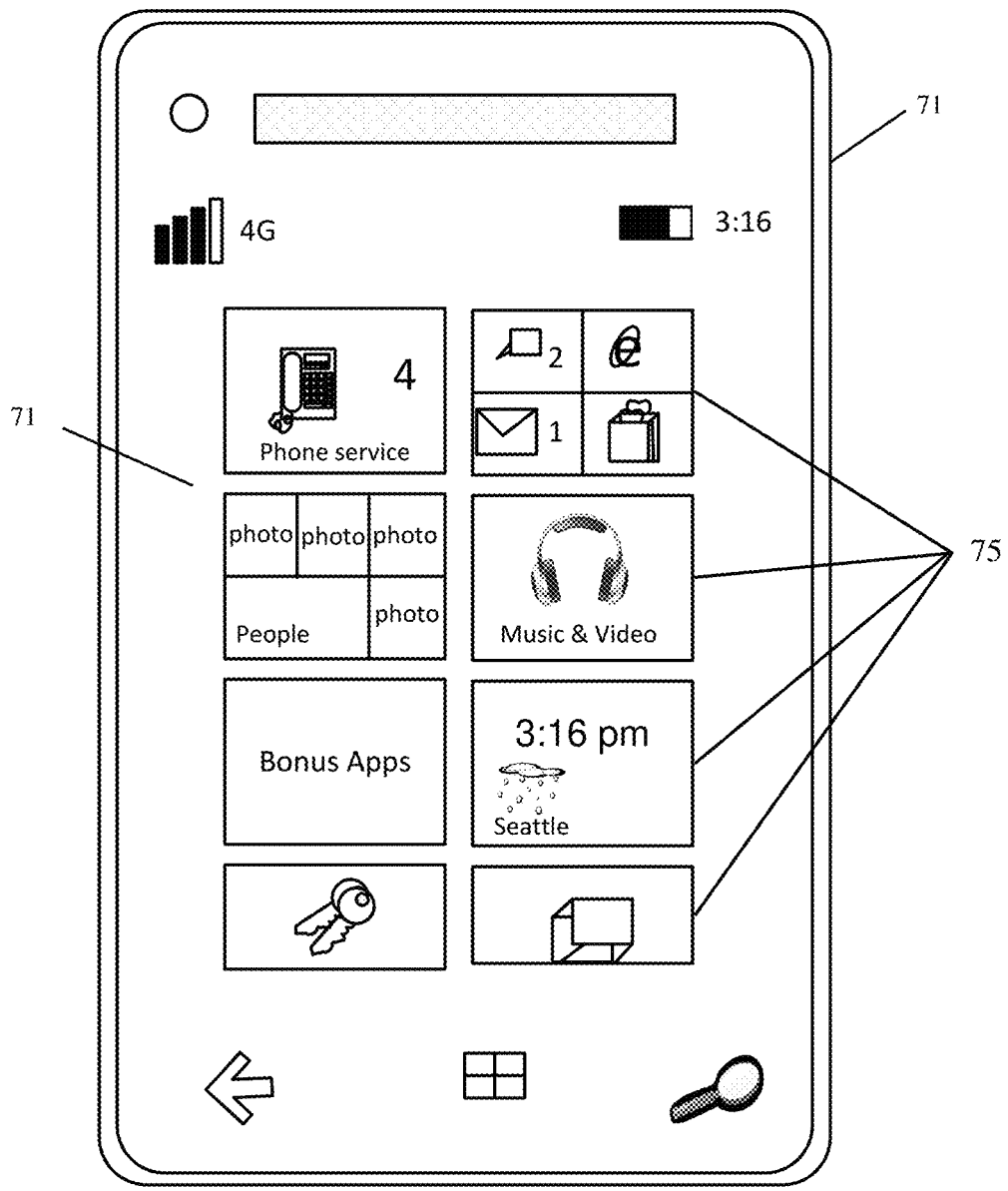

FIG. 8 is a simplified block diagram of one illustrative example of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one example in which device 16 is a tablet computer 1100. In FIG. 9, computer 600 is shown with user interface display screen 1102. Screen 1102 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 1100 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
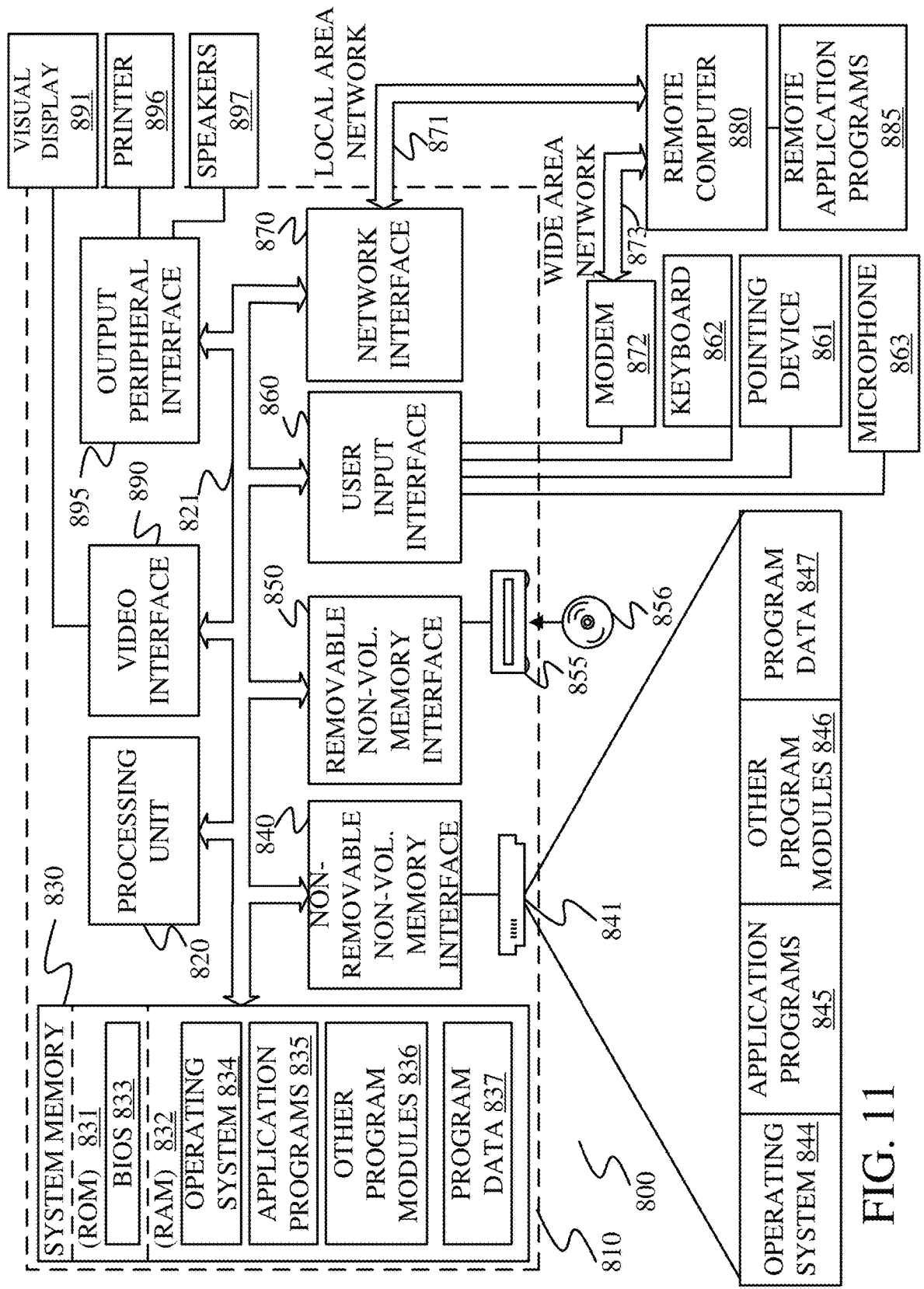
FIG. 11 is a block diagram of one example of a computing environment that can be used in the architectures shown in the previous figures.

FIG. 11 is one example of a computing environment in which architecture 100, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer system, comprising:
ticket management logic that receives an indication of an issue detected on a device;
diagnosing logic that identifies the issue based on contextual information received from the device and stores issue data related to the issue into a data store;
support channel identifier logic that receives an indication of a flagged component of issue data flagged by a developer and identifies a support channel based on the received issue data and the flagged component of issue data flagged by the developer; and
routing logic that initiates communication between a user of the device and the developer based at least in part on the identified support channel.

Example 2 is the computer system of any or all previous examples wherein the flagged component received by support channel identifier logic is a first issue category and wherein the support channel identifier is configured to identify the support channel based in part on the first issue category and a second issue category indicative of an issue category included in the issue data.

Example 3 is the computer system of any or all previous examples wherein the flagged component received by support channel identifier logic is a first concurrently running service and wherein the support channel identifier is configured to identify the support channel based in part on the first concurrently running service and a second concurrently running service included indicative of a concurrently running service in the issue data.

Example 4 is the computer system of any or all previous examples wherein the flagged component received by support channel identifier logic is a variable name and value wherein and the support channel identifier is configured to identify the support channel based in part on the first variable name and value and a second variable name and value indicative a variable name and value included in the issue data.

Example 5 is the computer system of any or all previous examples wherein the flagged component received by support channel identifier logic is a software build version and wherein the support channel identifier is configured to identify the support channel based in part on the first software build version and a second software build version indicative of a software build version included in the issue data.

Example 6 is the computer system of any or all previous examples wherein the support channel identifier logic is configured to receive an expertise indicator indicative of an expertise of the developer and to identify the support channel based at least in part on an expertise of the developer flagged with the flagging component.

Example 7 is the computer system of any or all previous examples and further comprising:
telephone logic, wherein the routing logic initiates the communication through the telephone logic utilizing a telephone protocol.

Example 8 is the computer system of any or all previous examples and further comprising:
live chat logic, wherein the routing logic initiates the communication through the live chat logic utilizing a live chat protocol.

Example 9 is the computer system of any or all previous examples and further comprising:
email logic, wherein the routing logic initiates the communication through the email logic utilizing an email protocol.

Example 10 is the computer system of any or all previous examples and further comprising:
remote assistance logic, wherein the routing logic initiates the communication through the remote assistance logic utilizing a remote assistance protocol.

Example 11 is a computer-implemented method, comprising:
receiving, with ticket management logic, an indication of a specific software issue from a user;
receiving, with support channel identifier logic, interest and expertise identifiers indicative of an interest and expertise of a developer;
comparing the indication of the specific software issue with the interest and expertise identifiers; and
facilitating, with routing logic, real-time communication between the user and the developer if the specific software issue is related to the interest and expertise of the developer, based on the comparison.

Example 12 is the computer-implemented method of any or all previous examples further comprising:
receiving, with ticket management logic, contextual information about a system the user is operating; and
processing the contextual information with diagnosing logic to identify a potential cause of the specific software issue.

Example 13 is the computer-implemented method of any or all previous examples wherein receiving the contextual information comprises receiving information related to services running on the system at a time the issue arose.

Example 14 is the computer-implemented method of any or all previous examples wherein receiving the contextual information comprises receiving information provided by the user.

Example 15 is the computer-implemented method of any or all previous examples wherein receiving interest and expertise identifiers comprises receiving a specific issue interest identifier indicative of the developer's interest in a specific issue and wherein facilitating real-time communication comprises:
determining, whether the specific issue corresponds to the specific software issue.

Example 16 is the computer-implemented method of any or all previous examples wherein receiving the specific issue interest identifier comprises receiving a variable value indicative of a value of a variable that caused the specific software issue.

Example 17 is the computer-implemented method of any or all previous examples and further comprising:
determining, with trend logic, a volume of users experiencing the specific software issue.

Example 18 is the computer-implemented method of any or all previous examples wherein facilitating real-time communication comprises:
determining, whether the specific indication of the software issue matches the interest and expertise identifiers of the developer; and
if so, automatically initiating the real-time communication.

Example 19 is a computer system, comprising:

an issue management component configured to receive issue indications indicative of software issues detected on a plurality of user devices;

trend logic configured to identify a plurality of trending issues amongst the detected software issues based on a number of user devices on which the detected software issues were detected;

support channel identifier logic configured to receive an issue identifier corresponding to a developer indicative of an interest in a single trending issue of the plurality of trending issues; and routing logic configured to facilitate a real-time communication between a user, facing the single trending issue on a user device corresponding to the user, and the developer.

Example 20 is the computer system of any or all previous examples wherein the routing logic is configured to automatically initiate the real-time communication at a time when the user is experiencing the single trending issue on the user device corresponding to the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
a processor; and
memory storing instructions executable by the processor, wherein the instructions, when executed, configure the computing system to:
generate an instruction to render a user interface display comprising:
a display pane that displays a set of issue records that represent a set of components of issue data associated with a support provider,
wherein each issue record:
corresponds to a particular one of the components of issue data, and
includes a set of display elements that define attributes of the particular component of issue data; and
an issue addition user input mechanism;
based on an indication of actuation of the issue addition user input mechanism, identify a selected component of issue data;
define attributes of the selected component of issue data;
add the selected component of issue data to the set of components associated with the support provider;
receive a support request indicative of an issue detected on a user device; and
select the support provider, from a plurality of support providers, based on a correlation between the support request and at least one of the components of issue data associated with the support provider.

2. The computing system of claim 1, wherein the instructions configure the computing system to:
identify a support channel between the user device and a support provider device associated with the support provider; and
generate a machine instruction that initiates a communication channel between the user device and the support provider device based on the identified support channel.

3. The computing system of claim 1, wherein the at least one component of issue data comprises a first issue category, and the instructions configure the computing system to:
select the support provider based in part on the first issue category and an indication of a second issue category included in the support request.

4. The computing system of claim 1, wherein the user interface display includes one or more attribute definition user input mechanisms, and the instructions configure the computing system to:
based on actuation of the one or more attribute definition user input mechanisms, define attributes of the selected component of issue data.

5. The computing system of claim 4, wherein the attributes include at least one of:
a variable name of a variable included in issue data,
a software build version associated with issue data,
an expertise indicator indicative of an expertise of the support provider relative to the selected component of issue data, or
a geographic region of interest associated with issue data.

6. The computing system of claim 5, wherein the attributes include a variable type that represents a datatype of the variable and a variable value that represents a value of the variable.

7. The computing system of claim 4, wherein the attributes include a flag that is selectively enabled, and the instructions configure the computing system to:
select the support provider based on a determination that the flag for the at least one component of issue data is enabled.

8. The computing system of claim 1, wherein the instructions configure the computing system to:
identify a plurality of support requests associated with the support provider; and
generate an instruction to render a list of the plurality of support requests.

9. The computing system of claim 8, wherein the instructions configure the computing system to:
generate an instruction to render a filter user input mechanism that is actuatable to filter the list based on a filter criterion.

10. The computing system of claim 8, wherein the filter criterion comprises a selected issue category.

11. The computing system of claim 8, wherein the instructions configure the computing system to:
generate an instruction to render a sort user input mechanism that is actuatable to sort the list based on a sort criterion.

12. The computing system of claim 10, wherein the instructions configure the computing system to:
generate an availability user input mechanism that is actuatable to set an availability status of the support provider.

13. A method performed by a computing system, the method comprising:
generating a user interface display comprising:
a display pane that displays a set of issue records that represent a set of components of issue data associated with a support provider, wherein each issue record:
corresponds to a particular one of the components of issue data, and
includes a set of display elements that define attributes of the particular component of issue data; and
an issue addition user input mechanism;

based on an indication of actuation of the issue addition user input mechanism, identifying a selected component of issue data;
defining attributes of the selected component of issue data;
adding the selected component of issue data to the set of components associated with the support provider;
receiving a support request indicative of an issue detected on a user device; and
selecting the support provider, from a plurality of support providers, based on a correlation between the support request and at least one of the components of issue data associated with the support provider.

14. The method of claim 13, and further comprising:
identifying a support channel between the user device and a support provider device associated with the support provider; and
generating a machine instruction that initiates a communication channel between the user device and the support provider device based on the identified support channel.

15. The method of claim 13, wherein the user interface display includes one or more attribute definition user input mechanisms, and the method further comprises:
based on actuation of the one or more attribute definition user input mechanisms, defining attributes of the selected component of issue data.

16. The method of claim 13, wherein the attributes include at least one of:
a variable name of a variable included in issue data,
a software build version associated with issue data,
an expertise indicator indicative of an expertise of the support provider relative to the selected component of issue data, or
a geographic region of interest associated with issue data.

17. The method of claim 16, wherein the attributes include a variable type that represents a datatype of the variable and a variable value that represents a value of the variable.

18. The method of claim 15, wherein the attributes include a flag that is selectively enabled, and the method comprises:
selecting the support provider based on a determination that the flag for the at least one component of issue data is enabled.

19. The method of claim 13, and further comprising:
identifying a plurality of support requests associated with the support provider; and
displaying a list of the plurality of support requests.

20. The method of claim 19, and further comprising:
displaying a filter user input mechanism that is actuatable to filter the list based on a filter criterion, and
displaying a sort user input mechanism that is actuatable to sort the list based on a sort criterion.

* * * * *